United States Patent [19]

MaCaudiere et al.

[11] Patent Number: 5,746,990
[45] Date of Patent: May 5, 1998

[54] PROCESS FOR THE PREPARATION OF RARE-EARTH SULPHIDES FROM HALIDES

[75] Inventors: Pierre MaCaudiere, Asnieres/Seine; Yvette Pescher, Bagneux, both of France

[73] Assignee: Rhone-Poulenc Chimie, Courbevoie, France

[21] Appl. No.: 620,071

[22] Filed: Mar. 21, 1996

[30] Foreign Application Priority Data

Mar. 22, 1995 [FR] France ................... 95 03325

[51] Int. Cl.$^6$ ................................. C01F 17/00
[52] U.S. Cl. ............... 423/263; 423/561.1; 252/519.4; 252/521.1; 117/99; 106/400
[58] Field of Search ............... 423/561.1, 263; 252/501.1, 301.45, 518.1, 519.4, 521.1; 106/400; 117/99

[56] References Cited

U.S. PATENT DOCUMENTS

| Re. 14,277 | 3/1917 | Garner et al. ............... 423/563 |
| 513,660 | 1/1894 | Vautin ............... 423/561.1 |
| 3,290,181 | 12/1966 | Sirtl ............... 148/1.6 |
| 3,748,095 | 7/1973 | Henderson ............... 423/21 |
| 5,439,660 | 8/1995 | Jansen et al. ............... 423/263 |
| 5,501,733 | 3/1996 | Macaudiere et al. ............... 106/461 |

FOREIGN PATENT DOCUMENTS

| 0203838 | 12/1986 | European Pat. Off. ......... C09C 1/00 |
| 2100551 | 3/1972 | France ............... C01F 17/00 |
| 5039638 | 12/1975 | Japan ............... 423/461.1 |
| 60-260403 | 12/1985 | Japan ............... C01B 17/20 |
| 158267 | 1/1963 | U.S.S.R. ............... 423/461.1 |
| 1344451 | 1/1974 | United Kingdom ............ C01F 17/00 |

*Primary Examiner*—Gary P. Straub
*Assistant Examiner*—Timothy C. Vanoy
*Attorney, Agent, or Firm*—Katherine L. Carleton

[57] ABSTRACT

The present invention concerns a process for the preparation of a rare-earth sulphide characterized in that a rare-earth halide is brought into the presence of an alkaline or aluminum halide and heated in the presence of hydrogen sulphide at a temperature which is sufficient to volatilize the halides.

More particularly, the halide is a chloride, the rare-earth is cerium and the alkali is sodium.

12 Claims, No Drawings

PROCESS FOR THE PREPARATION OF RARE-EARTH SULPHIDES FROM HALIDES

The present invention concerns a process for the preparation of rare-earth sulphides from rare-earth halides.

Rare-earth sulphides are particularly used as inorganic pigments. Inorganic colored pigments are already widely used in various industries, in particular the paint, plastics, cosmetics, concrete and ceramics industries.

Compositions based on rare-earth sulphides have proved to be particularly interesting substitutes for existing pigments based on heavy metals (in particular cadmium, lead, chromium and cobalt).

Because of the importance of these compositions, it is important to be able to draw on a number of processes for the preparation of these sulphides The aim of the present invention is to provide a novel process for the preparation of rare-earth sulphides.

This aim is achieved by providing a process for the preparation of a rare-earth sulphide characterized in that a rare-earth halide is brought into the presence of an alkali metal halide or aluminum halide and heated in the presence of hydrogen sulphide at a temperature which is sufficient to volatilize the halides.

Other characteristics, details and advantages of the invention will become apparent from the following description and non limiting illustrative example.

The starting substances for the process of the invention are a rare-earth halide and an alkali metal halide or aluminum halide.

The term "rare-earth" means elements from the group constituted by yttrium and elements from the periodic classification with atomic numbers of 57 to 71 inclusive.

The alkali metal halide or aluminum halide is used to volatilize the rare-earth halide.

In particular, the halide is a chloride.

In particular, the rare-earth is cerium, and the alkali metal is sodium.

Preferably, anhydrous halides are used. Mixtures of halides can be used.

The other reactant used in the process of the invention is hydrogen sulphide.

The hydrogen sulphide can be used alone, or mixed with an inert gas such as argon or nitrogen.

In a particular embodiment of the invention, the hydrogen sulphide is formed in situ by circulating a hydrogen-containing gas over sulfur. The gas may be hydrogen or a mixture of hydrogen and an inert gas as described above.

In this embodiment, and in a variation of the invention, the reactants are disposed in a particular manner in the reactor by positioning the rare-earth halide and the alkali metal halide or aluminum halide upstream with respect to the direction of circulation of the gas described above, and the sulphur, downstream. Hydrogen sulphide is then formed by retrodiffusion of the sulphur in the reactor. This avoids sulphuration of the rare-earth halide before volatilization.

More particularly the present invention relates to a process for the preparation of a rare-earth sulphide comprising the steps of:

1) providing a reactor a rare-earth halide into the presence of an alkali metal halide or aluminum halide.

2) heating the resulting reaction medium in the presence of hydrogen sulphide at a temperature which is sufficient to volatilize the halides, and 3) separating the obtained rare-earth sulphide from the reaction medium.

In a second embodiment, the process is carried out in a reactor constituted, for example, by a first tube in which a stream of $H_2S$ circulates.

In addition, a second reactor, in particular a tube reactor, is provided in which the halides are positioned and in which a stream of nitrogen is circulated. This second reactor opens into the first reactor. The second reactor can, for example, be located inside the tube constituting the first reactor and it may terminate in a tapered downstream portion opening into the first reactor. The sulphuration reaction occurs at the outlet to the second reactor, located in the hot zone of the first reactor, by mixing of the streams leaving the first and second reactors.

The second embodiment more particularly relates to a process for the preparation of a rare-earth sulphide comprising the steps of:

1) providing a rare-earth halide into the presence of an alkali metal halide in a first reactor through which a stream of nitrogen circulates, 2) heating said first reactor at a temperature which is sufficient to volatilize the halides 3) Introducing said stream issuing from said first reactor in a second reactor in which an H2S stream circulates and in which the sulphuration reaction takes place, and separating the obtained rare-earth sulphide from the reaction medium.

The second embodiment enables products to be produced which have a fine granulometry, for example below 1 μm.

The process is effected by heating the reaction medium to temperature which is sufficient to volatilize the halides. This temperature can, for example, be in the range of 700° C. to 1200° C. With the embodiment described above, the temperature inside the reactor can be adjusted so that it contains a first zone which is upstream with respect to the direction of gas circulation, at a volatilizing temperature (for example 700°–1050° C.) and in which the halides are positioned, then a second, downstream, zone which is at a higher temperature (for example 900°–1200° C.) to maximize the sulphuration reaction, and a third, downstream, zone, in which the sulphur is positioned, the temperature of this zone being higher than the sulphur vaporization temperature.

The process of the invention can be carried out in any suitable apparatus.

The process described can produce rare-earth sulphides with a variety of structures which depend on the rare-earth, which contain little or no oxygen, this latter depending on the operating conditions.

The following sulphides can be obtained with cerium: alpha($Ce_2S_3$), beta($Ce_{10}S_{14}O_xS_{1-x}$), and gamma($Ce_2S_3$).

The absence of oxygen and use of anhydrous halides encourages the formation of the alpha and the gamma structures.

The sulphides obtained using the process of the invention can be used as colored pigments.

More precisely, they can be used to color plastics which may be thermosoftening and thermosetting plastics.

Illustrative examples of thermoplastic resins which can be colored in accordance with the invention are polyvinyl chloride, polyvinyl alcohol, polystyrene, styrene-butadiene, styrene-acrylonitrile or acrylonitrile-butadiene-styrene (ABS) copolymers, acrylic polymers in particular polymethyl methacrylate, polyolefins such as polyethylene, polypropylene, polybutene, polymethylpentene, cellulose derivatives such as cellulose acetate, cellulose acetobutyrate, ethylcellulose, and polyamides such as polyamide 6—6.

Examples of thermosetting resins which are suitable for use with the sulphides of the invention are phenolic plastics, carbamide resins, in particular urea-formaldehyde copolymers, melamine-formaldehyde copolymers, epoxy resins and thermosetting polyesters.

The sulphides produced by the process of the invention can also be used in special polymers such as fluoropolymers, in particular polytetrafluoroethylene (PTFE), polycarbonates, silicone elastomers, and polyimides.

In this specific application to the coloring of plastics, the sulphides of the invention can be used directly in powder form. Preferably, they can be used in a pre-dispersed form, for example premixed with a portion of the resin, in the form of a concentrated paste or a liquid which means they can be introduced into any stage in the manufacture of the resin.

The sulphides of the invention can thus be incorporated into plastics such as those mentioned above, in a proportion by weight which is generally either 0.01% to 5% (with respect to the final product), or 40% to 70% in the case of a concentrate.

The sulphides produced by the process of the invention can also be used in the paint and stain industry, in particular in the following resins: alkyd resins, the most popular of which is glycerol-phthalic resin; long or short oil-modified resins; acrylic resins derived from esters of acrylic acid (methyl or ethyl) and methacrylic acid, which may be copolymerised with ethyl acetate, 2-ethylhexyl acetate or butyl acetate; vinyl resins such as polyvinyl acetate, polyvinyl chloride, polyvinyl butyral, polyvinyl formaldehyde, copolymers of vinyl chloride and vinyl acetate or vinylidene chloride, carbamide or phenolic resins, usually modified; polyester resins; polyurethane resins; epoxy resins; silicone resins.

In general, the sulphides are used in a proportion of 5% to 30% by weight in a paint, and 0.1% to 5% in a stain.

Finally, the sulphides of the invention are also suitable for applications in the rubber industry, in particular for floor coverings, in the paper industry and in printing inks, in the comestics industry, and in numerous other applications, non limiting examples of which are stains, finishing leather and in laminated coverings for kitchens and other work surfaces, in ceramics and in glazes.

The products produced by the process of the invention can also be used to color materials based on or obtained from at least one inorganic binder.

The inorganic binder can be selected from hydraulic binders, air binders, plaster and anhydrous or partially hydrated calcium sulphate type binders.

The term "hydraulic binders" means substances with the property of setting and hardening after the addition of water by forming hydrates which are insoluble in water. The products of the invention are particularly applicable for coloring cements and, of course, concretes made from these cements by the addition of water, sand and/or gravel thereto.

Within the context of the present invention, the cement can, for example, be a high-alumina cement. This means any cement containing a high proportion of either alumina itself or an aluminate, or both. Examples are calcium aluminate based cements, in particular SECAR type cements.

The cement can also be a silicate type cement, in particular a cement based on calcium silicate. Examples are Portland cements, among them rapid set or very rapid set Portland cements, white cements, sulphate resistant cements and cements containing blast furnace slag and/or light ash and/or meta-kaolin.

Hemihydrate based cements, calcium sulphate based cements and magnesia "Sorel" cements can also be mentioned.

The products from the process of the invention are also suitable for coloring air binders, i.e., binders which harden in the open air by the action of $CO_2$, of a calcium or magnesium oxide or hydroxide type.

Finally, they are suitable for coloring plaster and anhydrous or partially hydrated calcium sulphate binders ($CaSO_4$ and $CaSO_4, \frac{1}{2}H_2O$).

The rare-earth sulphides of the invention can, finally, be used as refractory products for metallurgy in the total absence of oxygen. They may also be used in the manufacture of crucibles by sintering.

An example is given below.

EXAMPLE a 1 m long tube reactor was positioned in a furnace. The tube was supplied with 10% by volume hydrogenated argon at a flow rate of 5 l/h. A mixture of anhydrous chlorides comprising 5.1 g of $CeCl_3$ and 16.9 g of NaCl was positioned in the reactor in a first box. 45 g of sulphur was positioned in a second, downstream, box.

The temperature was raised at 500° C./h and held at a temperature of 1200° C. in the reaction zones for 6 hours. During this time, the first box was positioned in a zone in the reactor which was at a temperature of 100° C., and the second in a zone of 450° C.

Grains of beta cerium sulphide were recovered at the end of the reaction.

What is claimed is:

1. A process for the preparation of a rare-earth sulphide comprising the steps of:

1) providing a mixture of a rare earth halide with either alkali metal halide or aluminum halide within a reactor,
   2) heating at a temperature which is sufficient to volatilize the halides,
   3) contacting the volatilized mixture with hydrogen sulphide, and
   4) separating the obtained rare-earth sulphide from the reaction medium.

2. The process of claim 1 wherein the hydrogen sulphide used in step 3 is formed by passing of a hydrogen containing gas over sulphur.

3. The process of claim 2, wherein hydrogen-containing gas is a mixture of hydrogen and an inert gas.

4. The process of claim 1, wherein the halides are chloride.

5. The process of claim 1, wherein the alkali metal is sodium.

6. The process of claim 1, wherein the rare-earth is cerium.

7. The process of claim 1, wherein the rare earth halide and the alkali metal halide or the aluminum halide are positioned in a first zone, said first zone being at a volatilizing temperature of said halides, a second zone is provided, said second zone being at a higher temperature and a third zone is provided in which sulfur is positioned at a temperature higher than the sulfur vaporization temperature.

8. A process for the preparation of a rare-earth sulphide comprising the steps of:

1) providing a rare-earth halide in the presence of an alkali metal halide in a first reactor through which a stream of nitrogen circulates,
   2) heating said first reactor at a temperature which is sufficient to volatilize the halides,
   3) Introducing said stream issuing from said first reactor in a second reactor in which an $H_2S$ stream circulates and in which the sulphuration reaction takes place, and
   4) separating the obtained rare-earth sulphide.

9. The process of claim 8 wherein the temperature in the first reactor is from about 700° to about 1050° C. and the temperature in the second reactor is from about 900° to about 1200° C.

10. The process of claim 8, wherein the halides are chloride.

11. The process of claim 8, wherein the alkali metal is sodium.

12. The process of claim 8, wherein the rare-earth is cerium.

* * * * *